United States Patent [19]

Perrey et al.

[11] 4,049,378
[45] Sept. 20, 1977

[54] DYESTUFF PREPARATIONS

[75] Inventors: Hermann Perrey, Krefeld; Jurgen Schulze, Opladen; Hans Jurgen Rosenkranz; Hans Rudolph, both of Krefeld; Reinhold Hornle, Cologne, all of Germany

[73] Assignee: Bayer Aktiengesellschaft, Leverkusen, Germany

[21] Appl. No.: 550,763

[22] Filed: Feb. 18, 1975

[30] Foreign Application Priority Data

Feb. 18, 1974 Germany .............................. 2407743
Mar. 4, 1974 Germany .............................. 2410185

[51] Int. Cl.² ....................... C09B 67/00; D06P 1/645
[52] U.S. Cl. ........................................... 8/87; 8/1 W; 8/39 R; 8/41 R; 8/42 R; 8/94 A; 8/173; 8/174; 8/DIG. 11
[58] Field of Search ................... 8/169, 172, DIG. 11, 8/173, 174, 87, 172 R

[56] References Cited

U.S. PATENT DOCUMENTS

| | | | |
|---|---|---|---|
| 2,238,486 | 4/1941 | Dickey et al. | 260/205 |
| 2,695,913 | 11/1954 | Bloch et al. | 260/471 |
| 2,946,767 | 7/1960 | Gassmann | 260/47 |
| 3,288,551 | 11/1966 | Raff | 8/21 |
| 3,362,780 | 1/1968 | Kuth et al. | 8/42 |
| 3,864,077 | 2/1975 | Popp et al. | 8/173 |

FOREIGN PATENT DOCUMENTS 1,363,131  8/1974  United Kingdom

Primary Examiner—Joseph L. Schofer
Assistant Examiner—A. L. Clingman
Attorney, Agent, or Firm—Plumley and Tyner

[57] ABSTRACT

The invention relates to dyestuff preparations which contain a. dyestuffs which are insoluble in tetrachloroethylene,
b. dispersing agents of the formula $$R^1[-NHCO-(O-CHR^2-CHR^3)_x-(O-CHR^4-CHR^5)_y-R^6-]_n$$

wherein
$R^1$ denotes a hydrocarbon radical such as remains after removing $n$ isocyanate groups from a corresponding isocyanate,
$n$ is a number from 1 to 6
$R^2$ - $R^5$ denote hydrogen, alkyl, phenyl or chloromethyl,
X represents the number 0 - 100 and
Y represents the number 0 to 50 and
$R^6$ denotes O—aryl, O—aralkyl, O—alkaryl, O—CO—alkyl, O—CO—aryl, NH—CO—alkyl, NH—SO₂—alkyl or O—alkyl and
c. optionally, organic solvents of low volatility. The preparations are extremely suitable for the dyeing textile materials from organic, water-immiscible solvents.

3 Claims, No Drawings

DYESTUFF PREPARATIONS

The invention relates to dyestuff preparations for dyeing textile materials from organic, water-immiscible solvents. The preparations are characterised in that they contain a. dyestuffs which are sparingly soluble or insoluble in tetrachloroethylene, b. dispersing agents of the formula

$$R^1[-NHCO-(O-CHR^2-CHR^3)_x-(O-CHR^4-CHR^5)_y-R^6]_n \quad (I)$$

wherein $R^1$ denotes an optionally substituted alkyl, cycloalkyl or aryl radical, such as remains after removing $n$ isocyanate groups from a corresponding n-functional isocyanate, $n$ is a number from 1 to 6, $R^2$–$R^5$ independently of one another denote hydrogen, lower alkyl, optionally substituted phenyl or chloromethyl, $x$ represents the numbers 0–100 and $y$ represents the numbers 0 to 50 and $R^6$ denotes O—aryl, O—aralkyl, O—alkaryl, O—CO—alkyl, O—CO—aryl, NH—CO—alkyl, NH—SO$_2$—alkyl or O—alkyl, with the proviso that $x$ and $y$ cannot simultaneously represent the number 0 unless $R^6$ denotes O—alkyl or O—alkaryl and c. optionally, organic solvents of low volatility.

Suitable alkyl radicals $R^1$ are those with 1–18 C atoms; suitable cycloalkyl radicals $R^1$ are above all cyclohexyl radicals and suitable aryl radicals $R^1$ are phenyl and naphthyl radicals, and the said radicals can contain, for example, urethane, uretdione or isocyanuric acid radicals. The aryl radicals and cycloalkyl radicals can preferably carry $C_1$-$C_4$-alkyl or chlorine substituents.

In the abovementioned formula (I), $n$ preferably represents 2–5, $x$ preferably represents 1–30 and $y$ preferably represents 0–20.

Suitable —O—alkyl, —NHCO—alkyl, —NHSO$_2$—alkyl and —OCO—alkyl radicals $R^6$ are those with 1–30, preferably 8–20, C atoms in the alkyl radical.

The aryl radicals mentioned in any desired context with $R^6$ are preferably phenyl and naphthyl radicals which can be substituted by $C_1$-$C_4$-alkyl, chlorine, $C_1$-$C_4$-alkoxy, hydroxyl and others.

Suitable O—aralkyl or O—alkaryl radicals $R^6$ preferably have 6–15 C atoms in the alkyl radical.

Dispersing agents of the formula (I) to be used particularly preferentially correspond to the formula

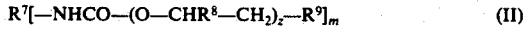

$$R^7[-NHCO-(O-CHR^8-CH_2)_z-R^9]_m \quad (II)$$

wherein $R^7$ denotes an alkyl or aryl radical which contains one or two isocyanuric acid radicals and is optionally substituted by methyl groups, such as remains after removing $m$ isocyanate groups from a corresponding m-functional isocyanate, $m$ is the number 3 or 4, $R^8$ denotes hydrogen or methyl, $z$ represents the numbers 0–30 and $R^9$ denotes O—alkyl or O—CO—alkyl, in each case with 8–20 C atoms in the alkyl radical, or O—phenylalkyl with 6–15 C atoms in the alkyl radical, with the proviso that $z$ represents 1–30 if $R^9$ denotes O—CO—alkyl or O—phenylalkyl.

Dyestuffs and whiteners are regarded as sparingly soluble if their solubility at room temperature does not exceed 10 g/1,000 g of tetrachloroethylene.

The dyestuffs which can be used in the dyestuff preparations according to the invention can belong to all categories of dyestuffs, such as, for example, to the categories of the diarylmethane, triarylmethane, xanthene, azine, oxazine or thiazine dyestuffs and especially the categories of the azo, anthraquinone, nitro, phthalocyanine, methine, styryl, stilbene, naphthoperinone, quinophthalone or 5-amino-8-hydroxy-1,4-naphthoquinone-imine dyestuffs. Metal complex dyestuffs of copper, nickel, chromium, cobalt, iron and aluminium are also suitable. Whiteners, regarded as a special category of dyestuffs, can also be used. As whiteners which can be used according to the invention there may be mentioned all customary derivatives of the stilbene, coumarin, carbostyrile, 1,3-diarylpyrazoline, 4-naphthalic acid imide, benzoxoline, pyrazole, thiazole, oxdiazole and triazine system.

The particle size of the dyestuffs should be less than 10µ, preferably between 1 and 2µ.

Preferred dyestuffs are azo dyestuffs, which are to be understood to include optionally metallised monoazo dyestuffs and disazo dyestuffs.

The dispersing auxiliaries to be used according to the invention are, in some cases, known as such (compare, for example, U.S. Pat. Nos. 2,695,913 and 2,946,767), or are easily accessible by reaction of substances containing isocyanate groups, or of masked isocyanates, with monohydroxy compounds. The following may be mentioned as suitable aliphatic, cycloaliphatic and aromatic compounds containing isocyanate groups: phenylisocyanate, methylisocyanate, cyclohexylisocyanate, stearylisocyanate, hexamethylenediisocyanate, cyclohexane-1,4-diisocyanate, 2,4- and 2,6-tolylenediisocyanate and their mixtures, isophoronediisocyanate (1-isocyanatomethyl-5-isocyanato-1,3,3-trimethylcyclohexane), phoronediisocyanate (2,2,4- or 2,4,4-trimethylhexamethylene-1,6-diisocyanate), 1,5-naphthalenediisocyanate, 1,3-cyclopentylenediisocyanate, m- and p-phenylenediisocyanate, 2,4,6- tolylenetriisocyanate, 4,4′,4″-triphenylmethanetriisocyanate, 1,3- and 1,4-xylylenediisocyanate, 3,3′-dimethyl-4,4′-diphenylmethanediisocyanate, 4,4′-diphenylmethanediisocyanate, 3,3′-dimethylbiphenylenediisocyanate, 4,4′-biphenylenediisocyanate, durenediisocyanate, 1-phenoxy-2,4′-phenylenediisocyanate, 1-tert.-butyl-2,4-phenylenediisocyanate, methylene-bis-4,4′-cyclohexyldiisocyanate, 1-chloro-2,4-phenylenediisocyanate and 4,4′-diphenylether-diisocyanate.

It is known from the chemistry of the isocyanates to prepare higher-molecular and optionally also higher-functional polyisocyanates from low-molecular base materials by a polymerisation reaction to form uretdiones of isocyanurate derivatives. Here there should be mentioned, for example, the uretdione from 2 mols of 2,4- tolylenediisocyanate and the polymerisation products, containing isocyanurate rings, obtained from 2,4- and 2,6-tolylenediisocyanate or hexamethylenediisocyanate, such as a system containing an average of 2 isocyanurate rings in the molecule and formed from 5 mols of tolylenediisocyanate or a corresponding derivative from an average of 2 mols of toluolenediisocyanate and 3 mols of hexamethylenediisocyanate. These, and also the isocyanates described subsequently, are outstandingly suitable for the preparation of the dispersing auxiliaries according to the invention.

According to a further method of synthesis it is possible to prepare higher biuret-linked systems from diisocyanates or polyisocyanates by partial hydrolysis via the stage of the carbamic acid and the amine, such as, for example, a biuret-linked compound which formally has been produced from 3 mols of hexamethylenediisocyanate with addition of one mol of water and elimination of one mol of carbon dioxide.

Suitable materials containing isocyanate groups are also contained on reaction of diols or polyols with difunctional or polyfunctional isocyanates, if the molar ratio of hydroxy compound to the isocyanate is so chosen that in the reaction products formed statistically free NCO groups always remain and a molecular weight of 2,000–3,000 is not exceeded. All diisocyanates and polyisocyanates described above can be reacted in this way with diols and polyols, such as, for example, monoethylene glycol and polyethylene glycol, propanediols, butanediols, neopentyl glycol and other pentanediols, adipol and other hexanediols, cyclohexanediols, 1,4-dihydroxymethylcyclohexane, perhydro-bis-phenol A, glycerol, trimethylolethane, trimethylolpropane and other hexanediols and pentaerythritol, under the preconditions described. Preferred reactions are those of diols and polyols with tolylenediisocyanate, in which 1 mol of the diisocyanate is reacted per OH group.

Further isocyanate-containing materials which are outstandingly suitable for the synthesis of the dispersing agents according to the invention are obtained when diisocyanates and polyisocyanates, such as, for example, all those described hitherto, whether pure or produced by synthesis reactions, are allowed to react with monoalcoholic compounds in such a way that at least one isocyanate group remains preserved per mol. Possible monoalcohols are all alcohols with 1 to 30 C atoms. Whilst this procedure lowers the functionality of the isocyanates employed, it proves possible, on the other hand, substantially to increase the hydrophobic character of the radical $R^1$ in the case of the preferred use of alcohols with more than 7 C atoms.

As has already been mentioned above, the compounds containing isocyanate groups can be reacted in the free form or in the masked form. Normally, phenols, acid amides, especially caprolactam, oximes and enol compounds are used for masking.

A large number of products can be used as monohydroxy compounds which as a result of reactions with the isocyanate-containing materials lead to the dispersing auxiliaries according to the invention. They are essentially alkoxylates of alcohols, phenols, carboxylic acids, carboxylic acid amides and sulphonamides. Outstandingly suitable auxiliaries are also obtained when the alcohols themselves are reacted.

Suitable alcohols which can be used direct or after alkoxylation are all saturated or unsaturated aliphatic and cycloaliphatic, as well as araliphatic, hydroxy compounds with 1 to 30 C atoms, but preferably with more than 8 C atoms, which are obtainable in the pure form or in the form of mixtures by reduction of fatty acids or fatty acid esters, which are prepared from vegetable oils, such as, for example, coconut oil, groundnut oil, palm oil, soya oil, linseed oil, maize oil or castor oil, or from animal oils or fats, such as, for example, fish oil, whale oil, tallow or lard, by the oxo synthesis, by the Ziegler process or by paraffin oxidation. The following may be mentioned here as examples: 1-octanol, iso-octanol, 2-ethyl-1-hexanol, 2-ethyl-4-methyl-1-pentanol, 2,2-dimethyl-1-hexanol, 1-nonanol, trimethyl-1-hexanol (2,4,4,3,5,5 and mixtures), 1-decanol, 1-dodecanol, iso-dodecanols, isotridecanol, 1-tetradecanol, 1-hexadecanol, isohexadecanol, 1-octadecanol, iso-octadecanol, 3,3,5-trimethylcyclohexanol, 4-tert.-butylcyclohexanol, 2-hydroxydecalin, 1,7,7-trimethylnorbornanol-(2), oleyl alcohol, eicosenyl alcohol, benzyl alcohol, 1- and 2-phenylethanol and 3-phenyl-1-propanol.

The following may be mentioned amongst the phenols which can be used for the preparation of the alkoxylates: phenol, monohalogenated and polyhalogenated phenols, naphthols, 2- and 4-hydroxydiphenyl, 3-benzyl-4-hydroxydiphenyl, phenols alkylated with 1–15 C atoms, such as, for example, cresols and ethylphenols, but preferably phenols alkylated with 6–15 C atoms, such as, for example, isooctylphenol, nonylphenols and dodecylphenols.

Available acids which can be alkoxylated are saturated and unsaturated aliphatic carboxylic acids with 1 to 30 C atoms, but preferably those with 10–22 C atoms, such as, for example, capric acid, lauric acid, palmitic acid, stearic acid, behenic acid, ricinoleic acid, ricinenic acid, linoleic acid or linolenic acid, or mixtures of saturated and/or unsaturated aliphatic carboxylic acids, which arise from the oxidation of paraffins and the oxo synthesis, or which are obtained by saponification of vegetable and animal fats. It is also possible to use, for the alkoxylation, cycloaliphatic and aromatic carboxylic acids, preferably in the range between 10 and 22 C atoms, such as, for example, cyclohexanecarboxylic acid, abietic acid, tert.-butylbenzoic acid and p-nonylbenzoic acid.

Amongst the acid amides which can be used for the alkoxylation in the sense of the invention, there may be recommended the carboxylic acid amides of the carboxylic acids described above, in the preferred C-number range, and preferably alkylsulphonamides containing 8–22 C atoms.

To prepare the alkoxylates, the compounds to be alkoxylated are reacted with alkylene oxides in accordance with known processes. Examples of alkylene oxides which can be used are ethylene oxide, propylene oxide, 1,2- and 2,3-epoxybutane, 2,3-epoxypentane, styrene oxide or epichlorohydrin, but preferably the two first-mentioned compounds. In the great majority of cases only one alkylene oxide, namely ethylene oxide, is employed, that is to say $y = 0$ in the general formula given above. To increase the hydrophobic character of the radical $R_4$ it is, however, at times desirable first to propoxylate and only then to ethoxylate the compound which can be alkoxylated.

The monohydroxy compounds are reacted with the isocyanate-containing materials in the usual manner to give the dispersing auxiliaries according to the invention. The reaction can be carried out in inert solvents or in the absence of solvents. All catalysts which are active in urethane-forming reactions can be used. Depending on the starting products, the substances are obtained as solids or liquids.

Products of a great variety of molecular weights can be obtained in accordance with the process of preparation described above. However, it has been found that products of optimum action lie in the moleculr weight range of between 500 and 10,000. Furthermore, it can be stated that substances containing polyurethane groups are even more effective than substances containing monourethane groups.

Organic solvents of low volatility which are optionally present in the preparations according to the invention are customary polar, physiologically larger harmless solvents which are chemically inert under the dyeing conditions and have boiling points above 150° C. The following may be mentioned as examples: paraffin oils, silicone oils and - preferably - phthalic acid dialkyl esters, especially the $C_1$–$C_8$-alkyl esters.

The action of the dispersing agents containing urethane groups can in some cases be boosted by the conjoint use of other surface-active agents, such as, for example, ethoxylates of fatty alcohols, fatty acids, fatty acid amides and alkylphenols, fatty acid esters of ethoxylated novolacs and surface-active amine oxides.

The dyestuff preparations according to the invention are advantageously prepared by thoroughly mixing the components with one another and carefully grinding or kneading them in a comminuting machine, for example a stirred ball mill, a steel ball mill or a kneader. Usually, organic solvents, such as, for example, have been mentioned above, are used as grinding media to achieve better grinding. Whilst in principle it is possible to dispense with the use of such materials when employing the urethane-containing dispersing auxiliaries, it is in many cases advisable to use a combination of the mixtures of materials according to the invention with the organic solvents described above to achieve a sensible viscosity of the dyestuff preparations, and also for cost reasons. It is also possible to use auxiliaries which are known in dyeing technology, such as, for example, thickeners.

The preparations according to the invention can optionally also contain yet further additives, such as aliphatic halogenohydrocarbons, water or aliphatic alcohols. However, preferably the preparations are free from water.

To produce the preparations according to the invention, the solvents of low volatility and the dispersing agents described are employed in such amount that about 0–20 parts of solvent and about 0.1–20 parts of dispersing agent are present per part of dyestuff. The preparations according to the invention usually contain 5%, and preferably 10–40%, of dyestuff, relative to the weight of the dyestuff preparation.

The dyeing preparations according to the invention, which are distinguished by good stability on storage, are outstandingly suitable for the preparation of baths for dyeing textile materials from organic water-immiscible solvents, such as aliphatic halogenohydrocarbons, especially trichloroethylene, tetrachloroethylene and 1,1,1-trichloropropane. On dilution with halogenohydrocarbons, for example tetrachloroethylene, they give dispersions which are stable even under dyeing conditions, that is to say at high temperatures. For this reason, outstandingly level dyeings are obtained when dyeing with the dyebaths prepared by means of the dyestuff preparations according to the invention, and contamination of the dyeing equipment by rubbing-off of the dyestuffs is avoided.

The halogenohydrocarbon dyebaths, especially tetrachloroethylene dyebaths, prepared by means of the dyestuff preparations according to the invention are suitable for dyeing all fibre materials which can be dyed with the dyestuffs contained in the dyestuff preparations, by the continuous process and above all by the exhaustion process.

Suitable fibre materials are: fibre materials of cellulose, for example cotton, or regenerated cellulose, such as viscose and rayon; polyacrylonitrile; polyesters, such as cellulose 2½-acetate and cellulose triacetate, and polyesters, such as polyethylene glycol terephthalate, or polyesters from 1,4-bis-(hydroxymethyl)-cyclohexane and terephthalic acid; polyamides, such as natural polyamides, for example wool and silk, and synthetic polyamides, such as poly(hexamethylenediamine adipate), polycaprolactam or poly-ω-aminoundecanoic acid; or polyurethanes.

The parts mentioned in the examples which follow are parts by weight.

EXAMPLE 1

87 g of an isomer mixture of 80 parts of 2,4- and 20 parts of 2,6- tolylenediisocyanate are added dropwise at room temperature to a solution of 546 g of a polyetherester from 1 mol of oleic acid and 10 mols of ethylene oxide in 1 l of acetone. To complete the reaction, the mixture is heated to the reflux temperature for 3 hours. The solvent is then distilled off. A pale yellow viscous oil is obtained, which is soluble in organic solvents such as perchloroethylene and dibutyl phthalate.

EXAMPLE 2

744 g of a polyglycol ether from 11 mols of ethylene oxide and 1 mol of 3-benzyl-4-hydroxy-bisphenyl are added dropwise at room temperature to a solution of 147 g of a biuret-linked triisocyanate, which has formally been produced from 3 mols of hexamethylenediisocyanate by reaction with one mol of water, with elimination of one mol of carbon dioxide, in 500 ml of ethyl acetate. The mixture is then heated for 3 hours to the reflux temperature and the solvent is distilled off. A pale yellow viscous oil is obtained as the reaction product.

EXAMPLE 3

158.4 g of a 2,4-tolylenediisocyanate polymer, in which an average of 5 mols of toluolenediisocyanate have been polymerised to a tetraisocyanate containing 2 isocyanurate rings, in the form of a 55% strength solution in ethyl acetate, are added dropwise to a solution of 217.6 g of a polyetherester from oleic acid and 6 mols of ethylene oxide in 200 ml of ethyl acetate, and the mixture is then heated to the reflux temperature for 1 hour. After distilling off the solvent, a highly viscous yellow-brown oil is obtained.

EXAMPLE 4

158.4 g of the 55% strength tetraisocyanate described in Example 3 are added dropwise to a solution of 74.4 g of dodecanol in 300 ml of acetone. The mixture is heated to the reflux temperature for 2 hours and the solvent is then distilled off. A colourless solid reaction product is obtained.

EXAMPLE 5

Analogously to Example 3, 395 g of the 55% strength tetraisocyanate based on tolylenediisocyanate are reacted with 528 g of a nonylphenol alkoxylated with 10 mols of ethylene oxide. The reaction product isolated is a pale yellow, highly viscous oil.

EXAMPLE 6

Analogously to Example 3, 197.5 g of the 55% strength tetraisocyanate are reacted with 135.5 g of stearyl alcohol. After working up, a colourless, hard waxy product is obtained.

EXAMPLE 7

40 parts of the surface-active agent prepared according to Example 1 and 40 parts of phthalic acid dibutyl ester are added to 20 parts of the disperse dyestuff

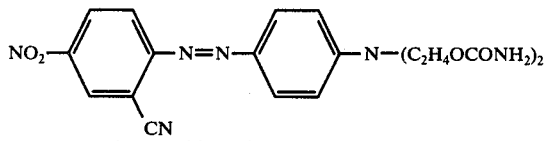

(prepared in analogy to U.S. 2 238 486)

the mixture is ground in a bead mill and after the desired degree of fineness of approx. 1.0 to maximally 2.0µ has been reached, the mixture is separated from the grinding beads. The dispersion concentrate obtained is fluid, has excellent storage stability and after dilution with tetrachloroethylene gives heat-stable dispersions which are very suitable for dyeing synthetic fibre materials.

EXAMPLE 8

10 parts of the dyestuff according to Example 7 are mixed with 20 parts of the surface-active agent prepared according to Example 2, 10 parts of a fatty acid ester of a novolac ethoxylation product U.S. Pat. No. 3,864,077 and 60 parts of phthalic acid dibutyl ester and the mixture is ground in a bead mill. The dispersion concentrate obtained after separating off the grinding beads gives, on dilution with tetrachloroethylene, comparably good dyebaths to those according to Example 7.

EXAMPLE 9

10 parts of the disperse dyestuff according to Example 7 are ground in a sand mill with 20 parts of the surface-active agent prepared according to Example 5, 10 parts of a fatty acid ester of a novolac ethoxylation product (described in DOS German Published Specification No. 2,143,993, Example 1) and 60 parts of phthalic acid dibutyl ester. The resulting dispersion is fluid and has excellent storage stability. Dilution of the resulting dyestuff preparation with tetrachloroethylene gives a stable dispersion which is very suitable for dyeing synthetic fibre materials — especially polyethylene terephthalate fibres — by the exhaustion process.

100 parts of a fabric of texturised polyethylene terephthalate fibres are introduced, without prior cleaning, into a dyebath at room temperature, which has been prepared by diluting 5 parts of the dyestuff preparation described with 1,600 parts of tetrachloroethylene. The bath is rapidly warmed to 120° C with vigorous circulation of the liquor and is kept at this temperature for 30 minutes. It is then cooled to 90° C and the dyeing liquor is separated off. No precipitation of dyestuff whatsoever is observed in the dyeing apparatus or on the textile goods. The latter are lightly rinsed with fresh tetrachloroethylene to remove the dyeing liquor which still adheres. After drying, a deep, level burgundy dyeing is obtained.

An equally good dyeing is obtained if instead of polyethylene terephthalate fabric a roll of texturised polyethylene tereohthalate fibres is dyed under identical conditions in a package-dyeing apparatus.

EXAMPLE 10

10 parts of the disperse dyestuff according to Example 7 are ground with 20 parts of the surface-active agent prepared according to Example 6 and 70 parts of phthalic acid dibutyl ester in a bead mill and after reaching the desired finely divided state of the dyestuff, of maximally 2.0µ, the ground material is separated from the grinding beads. The resulting dispersion is fluid, has excellent storage stability, and can readily be dispersed in tetrachloroethylene to give heat-stable dispersions.

An equivalent dyestuff preparation is obtained if instead of the disperse dyestuff used, the same amount of the following disperse dyestuff is employed.

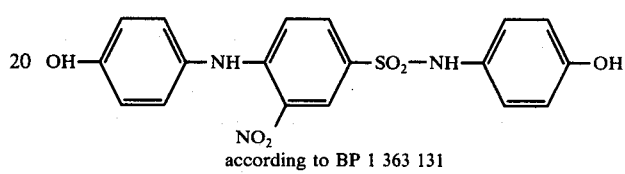

according to BP 1 363 131

EXAMPLE 11

10 parts of the disperse dyestuff

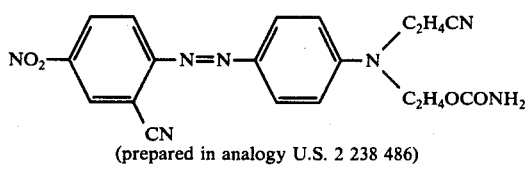

(prepared in analogy U.S. 2 238 486)

are mixed with 20 parts of the surface-active agent prepared according to Example 4 and 70 parts of phthalic acid dibutyl ester and the mixture is ground in a sand mill until the particle size of the dyestuff is approx. 1.0 to maximally 2.0µ. After separating off the grinding beads, a dispersion concentrate is obtained, which is fluid and has excellent storage stability.

After diluting the resulting dispersion concentrate in tetrachloroethylene, a stable dispersion is obtained, which is very suitable for dyeing synthetic fibres — especially polyethylene terephthalate fibres — by the continuous process.

A polyethylene terephthalate fibre fabric is impregnated with a dispersion of 50 parts of the dyestuff preparation described, in 1,600 parts of tetrachloroethylene, and squeezed off. After drying for 15 seconds at 100° C, the dyestuff is fixed by a heat treatment of 45 seconds at 190° C. The fabric can subsequently easily be washed clear with pure tetrachloroethylene at room temperature. After drying, a deep and level red dyeing is obtained.

If instead of the surface-active agent prepared according to Example 4, the same number of parts of the surface-active agent prepared according to Example 3 are used and the procedure followed is analogous to Example 11, a dispersion concentrate is obtained, which on dilution in tetrachloroethylene gives comparably good dyebaths.

EXAMPLE 12

10 parts of the disperse dyestuff according to Example 11 are mixed with 20 parts of the surface-active agent prepared according to Example 4, 5 parts of water and 65 parts of phthalic acid dibutyl ester and the mixture is ground in a sand mill until the particle size of the dyestuff is approx. 1.0 — maximally 2.0µ. After separating off the grinding beads, a dispersion concentrate which is fluid and has excellent storage stability is obtained.

After diluting the resulting dispersion concentrate in tetrachloroethylene, a stable dispersion is obtained, which is very suitable for dyeing synthetic fibres — especially polyethylene terephthalate fibres — by the exhaustion process.

EXAMPLE 13

10 parts of the whitener

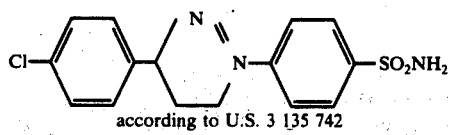

according to U.S. 3 135 742 are mixed with 10 parts of the surface-active agent prepared according to Example 5 and 80 parts of phthalic acid dibutyl ester and the mixture is ground in a sand mill. The resulting dispersion is very fluid and has excellent storage stability.

Dilution of the resulting preparation with tetrachloromethylene gives a heat-stable dispersion which is very suitable for whitening synthetic fibres by the exhaustion process.

100 parts of a fabric of polyamide fibres are introduced, without prior cleaning, into a dyebath at room temperature, which has been prepared by diluting 1 part of the preparation described with 1,600 parts of tetrachloroethylene. The bath is rapidly warmed to 100° C with vigorous circulation of the liquor and is kept at this temperature for 30 minutes. It is then cooled to 90° C and the dyeing liquor is separated off. The textile goods are rinsed with fresh tetrachloroethylene in order to remove the liquor which still adheres. After drying, a level brilliant whitening is obtained.

An equivalent preparation is obtained if instead of the whitener used, the same amount of one of the following whiteners is employed.

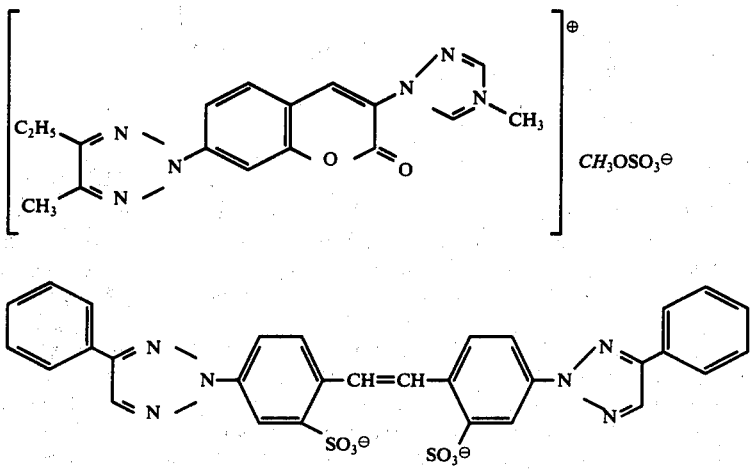

Furthermore, the preparations obtained are suitable for whitening 2½-acetate and 3-acetate as well as polyacrylonitrile and wool by the exhaustion process and the continuous process. For whitening wool and polyacrylonitrile it is convenient to prepare stable water-in-tetrachloroethylene emulsions containing the whitener from the tetrachloroethylene liquors prepared with the preparations described and small amounts of water.

EXAMPLE 14

10 parts of the dyestuff C.I. No. 51,005 are mixed with 10 parts of the surface-active agent prepared according to Example 4 and 80 parts of phthalic acid dibutyl ester, the mixture is ground in a bead mill and after the desired fineness of approx. 1.0 to maximally 2.0µ has been reached, the mixture is separated from the grinding beads. A dispersion concentrate which is fluid and has excellent storage stability is obtained.

Dilution of the dyestuff preparation described with tetrachloroethylene gives dyeing liquors which are very suitable for dyeing polyacrylonitrile fibre materials and base-modified polyester materials by the exhaustion process.

100 parts of polyacrylonitrile fibre fabric are introduced into a dyebath which contains 5.0 parts of the dyestuff preparation prepared according to Example 14, 0.2 part of a commercial cleaning booster (Tempo RTC), 0.001 part of citric acid, 1,600 parts of tetrachloroethylene and 0.8 part of water.

The dyebath is warmed to 100° C in a closed apparatus, with vigorous circulation of the liquor, and is kept at this temperature for 30 minutes. After cooling to 80°–85° C, the dyebath is separated from the textile goods and the latter are rinsed with fresh tetrachloroethylene. A deep level blue dyeing is obtained, the fastness properties of which correspond to a purely aqueous dyeing with the same dyestuff.

EXAMPLE 15

15 parts of the reactive dyestuff III

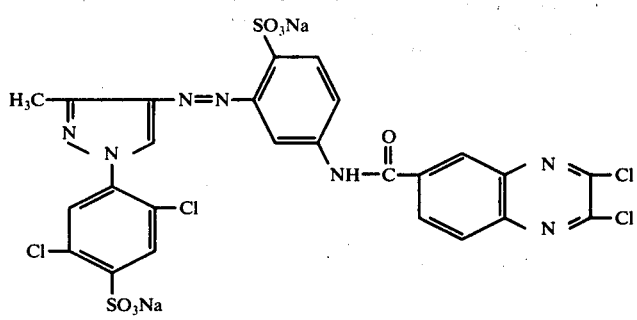

according to DAS German Published Specification No. 1,619,530 are ground with 15 parts of the surface-active agent prepared according to Example 3 and 70 parts of phthalic acid dibutyl ester in a bead mill. A finely divided fluid dyestuff preparation is obtained, which is distinguished by very good storage stability.

Dilution of the resulting dyestuff preparation with tetrachloroethylene gives a heat-stable dispersion which is very suitable for dyeing cotton fibre materials.

100 parts of cotton nettle are introduced into a dyebath which has been prepared from 3 parts of the dyestuff preparation, 6 parts of oleic acid ethanolamide, 6 parts of oleyl alcohol eicosaethylene glycol ether, 30 parts of water, 3 parts of sodium carbonate and 2,000 parts of tetrachloroethylene. The fabric is dyed for 45 minutes at 40°–50° C and is rinsed, after separating off the dyeing liquor, with a tetrachloroethylene-water emulsion. A level deep yellow dyeing with good fastness properties is obtained.

EXAMPLE 16

15 parts of reactive dyestuff I

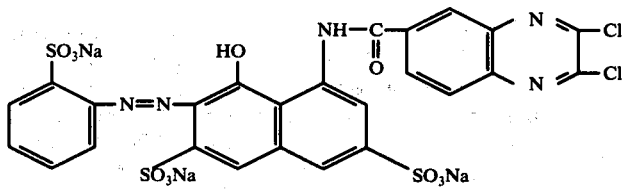

according to DAS German Published Specification No. 1,619,530 are mixed with 15 parts of the surface-active agent prepared according to Example 5 and 70 parts of phthalic acid dibutyl ester and the mixture is ground in a bead mill. A fluid dispersion concentrate is obtained, which after dilution with tetrachloroethylene is very suitable for dyeing wool.

100 parts of wool are introduced into a dyebath which contains 10 parts of the dyestuff preparation, 0.2 part of a cleaning booster (Tempo RTC), 1,600 parts of tetrachloroethylene, 0.1 part of glacial acetic acid and 20–30 parts of water.

The temperature is brought to 100° C in a closed apparatus, with vigorous agitation of the liquor, and dyeing is carried out at this temperature for 30 minutes. After cooling to 85°–80° C, the dyeing liquor is separated off and the wool is rinsed with fresh tetrachloroethylene. After drying, a deep red dyeing with good fastness properties is obtained.

We claim:
1. Dyestuff preparations for dyeing textile materials from organic water-immiscible solvents, which are characterised in that they contain
   a. dyestuffs having a particle size of less than 10μ and which are sparingly soluble or insoluble in tetrachloroethylene;
   b. dispersing agents of the formula

$R^7[-NHCO-(O-CHR^8-CH_2)_z-R^9]_m$ wherein
   $R^7$ denotes an alkyl or aryl radical which contains one or two isocyanuric acid radicals and is optionally substituted by methyl groups, such as remains after removing $m$ isocyanate groups from a corresponding $m$-functional isocyanate,
   $m$ is the number 3 or 4,
   $R^8$ denotes hydrogen or methyl,
   $z$ represents the numbers 0–30 and
   $R^9$ denotes O-alkyl or O-CO-alkyl, in each case with 8–20 C atoms in the alkyl radical, or O-phenylalkyl with 6–15 C atoms in the alkyl radical, with the proviso that $z$ represents 1–30 if $R^9$ denotes O—CO—alkyl or O-phenylalkyl; and
   c. an organic solvent comprising phthalic acid $C_1$-$C_8$-dialkyl ester.

2. The dyestuff preparation of claim 1 wherein said ester is phthalic acid dibutyl ester.

3. The dyestuff preparation of claim 1 wherein from about 0 to 20 parts of phthalic acid dialkyl ester and from about 0.1 to 20 parts of dispersing agent are present for one part of dyestuff.

* * * * *